(12) United States Patent
Hersh

(10) Patent No.: US 6,792,200 B2
(45) Date of Patent: Sep. 14, 2004

(54) SYSTEM AND METHOD FOR A PRE-FABRICATED HEAT-TRACED HEADER

(75) Inventor: Lyle Hersh, Famington, NM (US)

(73) Assignee: Arizona Public Service Company, Inc., Phoenix, AR (US)

( * ) Notice: Subject to any disclaimer, the term of this patent is extended or adjusted under 35 U.S.C. 154(b) by 117 days.

(21) Appl. No.: 10/116,328

(22) Filed: Apr. 4, 2002

(65) Prior Publication Data

US 2003/0190162 A1 Oct. 9, 2003

(51) Int. Cl.⁷ .............................................. F24H 1/00
(52) U.S. Cl. ...................................... 392/468; 392/480
(58) Field of Search ............................... 392/468, 480, 392/465, 466

(56) References Cited

U.S. PATENT DOCUMENTS

| | | |
|---|---|---|
| 3,706,872 A | 12/1972 | Trabilcy |
| 3,784,785 A | 1/1974 | Noland |
| 4,111,237 A * | 9/1978 | Mutzner et al. ............ 138/125 |
| 4,581,521 A | 4/1986 | Grise |
| 4,874,925 A | 10/1989 | Dickenson |
| 5,390,961 A | 2/1995 | Guthrie |
| 5,445,191 A * | 8/1995 | Green et al. ................ 138/126 |
| 5,544,275 A | 8/1996 | Ebbing et al. |
| 5,654,475 A * | 8/1997 | Vassiliou et al. ........... 562/413 |
| 5,871,034 A | 2/1999 | Sumner |
| 5,933,574 A * | 8/1999 | Avansino .................... 392/468 |
| 6,182,705 B1 | 2/2001 | Sumner |

* cited by examiner

Primary Examiner—Thor Campbell
(74) Attorney, Agent, or Firm—Snell & Wilmer L.L.P.

(57) ABSTRACT

A flexible heat traced pipe is uniquely pre-fabricated to expedite the installation and repair process. The flexible heat traced pipe includes an inner structure, an outer structure, a heat trace, and a connector which are all cured into a unitary fluid carrying device. The flexible heat traced pipe includes a flexible rubber header.

19 Claims, 6 Drawing Sheets

SYSTEM AND METHOD FOR A PRE-FABRICATED HEAT-TRACED HEADER

FIELD OF INVENTION

The present invention generally relates to heat-traced headers, and more particularly, to pre-fabricated heat-traced headers for use in industrial applications.

BACKGROUND OF THE INVENTION

When the surrounding environment is sufficiently cold, some fluids, such as water, may freeze in certain conveying pipes. To address this issue, freeze protection is often added to the pipes in the form of a heat tracing tape which heats the pipe and the fluid within the pipe. The pipe and heat trace are usually further protected by suitable insulation surrounding the pipe and heat trace tape. In this manner, heat tracing is often used in association with piping found in scrubbers, power plants, and other industrial applications which can be subjected to freezing temperatures.

In an industrial setting, it is typically desirable to replace or repair segments of piping in a relatively short time period. For example, during an overhaul, workers have a limited amount of time to work on the systems in the plant. The time period available for repair may be even shorter when repairs are made during non-planned outages. However, it is typically very time consuming to complete the multiple steps often required for heat tracing a pipe. Also, prior art heat tracing systems and methods occasionally fail thereby leaving piping systems unprotected from freezing temperatures. Therefore, it is desirable to have a method and apparatus that facilitates fast and reliable installation and repairs of freeze protected piping in industrial applications.

BRIEF SUMMARY OF THE INVENTION

In accordance with one aspect of the present invention, a flexible heat traced pipe is uniquely pre-fabricated to expedite the installation and repair process. The flexible heat traced pipe includes an inner structure, an outer structure, a heat trace, and a connector which are all cured into a unitary fluid carrying device. In accordance with another aspect of the present invention, the flexible heat traced pipe includes a flexible rubber header.

BRIEF DESCRIPTION OF THE DRAWINGS

A more complete understanding of the present invention may be derived by referring to the detailed description and claims when considered in connection with the Figures, where like reference numbers refer to similar elements throughout the Figures, and:

DETAILED DESCRIPTION OF EXEMPLARY EMBODIMENTS OF THE INVENTION

In accordance with one aspect of the present invention, in general, a flexible heat traced pipe is pre-fabricated for quick and easy installation. Moreover, heat traced pipe 100, in one exemplary embodiment of the present invention, is a header.

Figure 1:
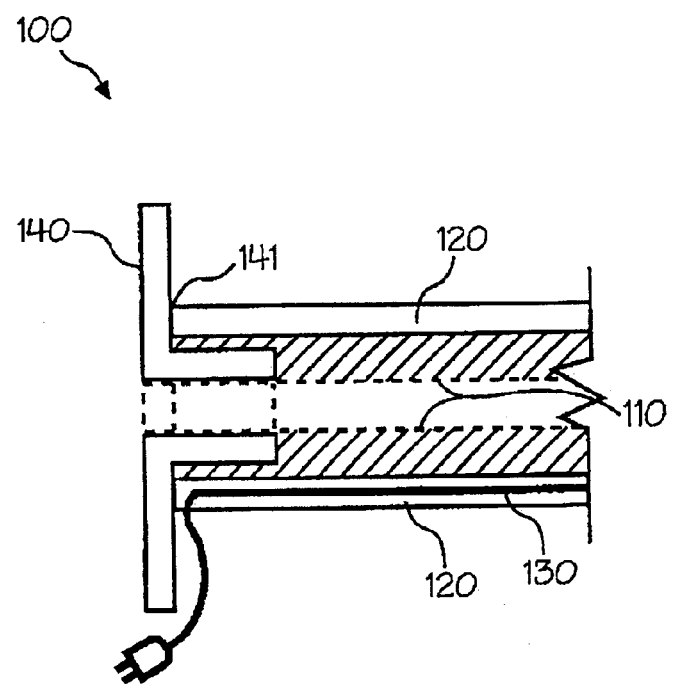
FIG. 1 illustrates a side cross sectional view of an exemplary heat traced pipe in accordance with an exemplary embodiment of the present invention.
Figure 2:
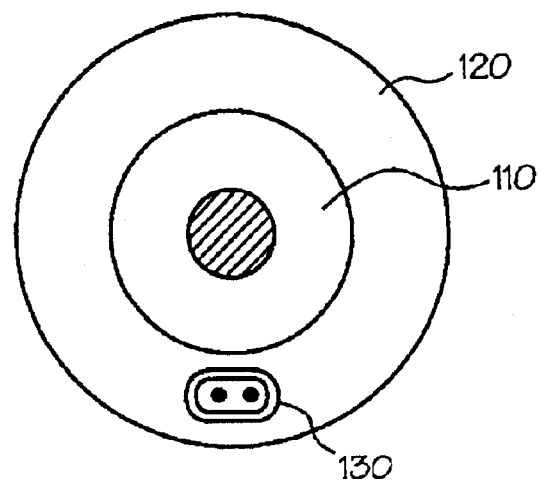
FIG. 2 illustrates a cross sectional view of an exemplary heat traced pipe in accordance with an exemplary embodiment of the present invention.

In one exemplary embodiment of the present invention, heat traced pipe 100 is configured to be flexible. A flexible heat traced pipe may be prefabricated to allow, for example, bending to permit a single length of pipe to accommodate various distances between pipe connections. A flexible heat traced pipe may also support installation around obstacles by bending to avoid obstructions. Furthermore, flexible heat traced pipe may be useful in installations which have curved piping specifications. Flexible heat traced pipe may also be advantageous in installations which may be impacted by the thermal expansion properties of the pipe or surrounding structure. The flexible heat traced pipe may also be configured to limit the bending to certain parameters, such as, for example, a bending radius that is no smaller than four times the diameter of the pipe. More particularly, in accordance with an exemplary embodiment of the present invention, and with reference now to FIGS. 1 and 2, a heat traced pipe 100 includes an inner structure 110, an outer structure 120, and a heat trace 130.

In an exemplary embodiment, inner structure 10 includes any material of any shape or composition which is capable of suitably conveying a fluid. In one embodiment, inner structure 110 is comprised of any suitable flexible material, and in an exemplary embodiment of the present invention, the flexible inner structure 110 comprises a flexible rubber, such as pure gum rubber. Furthermore, other suitable flexible inner structures 110 may be selected based on the conveyed fluid and/or surrounding environment wherein the structure allows for suitable flows and will not substantially degrade from environmental conditions.

The pipe may be configured to convey any suitable fluid. Although the conveyed fluid may be described herein as a process liquor, the fluid may include other fluids such as air, gas, water, oil, slurry, and/or the like. These fluids may or may not be corrosive. In various exemplary embodiments of the present invention, the inner structure flexible material may be corrosion resistant. A corrosion resistant inner structure flexible material maybe desirable, for example, in scrubbers which remove a portion of the gases and particulates from exhaust gases. In this exemplary environment, water may be chemically treated to create a process liquor which is sprayed in the scrubber to remove gases and particulates from the exhaust gases. The process liquor may be corrosive due to the acidic or basic nature of the water treatment. For example, the pH of process liquor may be in the range of 5.5 to 8.0. Therefore, a flexible material that is corrosion resistant, such as pure gum rubber, allows the fluid being conveyed, and/or the environment in which the pipe is installed, to be corrosive without substantial degradation of the pipe or the heat trace.

In accordance with an exemplary embodiment of the present invention, outer structure 120 includes any material of any shape or composition which is capable of at least partially surrounding, supporting and/or protecting inner layer 110. In one embodiment, outer structure includes any suitable flexible material, and in an exemplary embodiment of the present invention, outer structure 120 includes a flexible rubber, such as pure gum rubber. In another exemplary embodiment of the present invention, outer structure 120 comprises a rubber which includes a suitable percentage of butyl. For example, the rubber may comprise two to four percent butyl, and preferably three percent butyl. Outer structure 120 may be configured to protect heat trace 130, and pipe integrity in general, from the surrounding environment. For example, outer structure 120 may protect heat trace 130 from bumps, scrapes and abrasions that may occur, from time to time, to pipes in industrial application settings. Outer structure 120 is configured to at least partially surround inner structure 110, and in an exemplary embodiment, fully surrounds inner structure 110.

Figure 3:
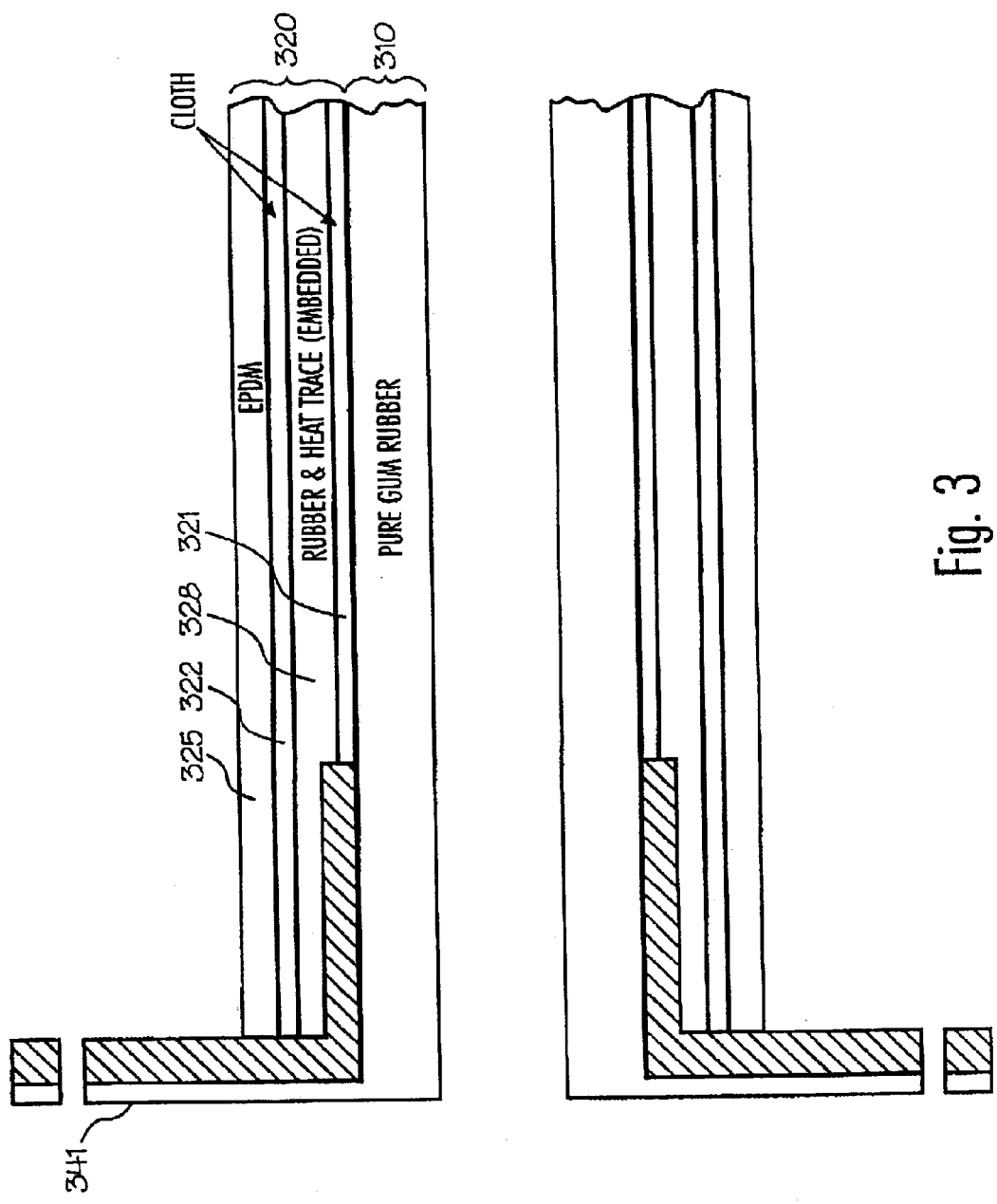
FIG. 3 illustrates a more detailed side cross sectional view of an exemplary heat traced pipe in accordance with an exemplary embodiment of the present invention.

With reference now to FIG. 3, outer structure 320 may also comprise any material which is capable of suitably protecting the rubber layers (e.g., 328 and 310) from cracks, leaks and other degradation of the rubber materials caused by ultra violet ("UV") light and/or ozone. For example, outer structure 320 may include one or more layers 325 of ethylene propylene diene monomer ("EPDM") material. EPDM layers 325 is configured to at least partially surround flexible outer structure material 328. In accordance with one exemplary embodiment of the present invention, a 1/16" EPDM layer 325 protects the outer structure material 328 from UV rays and ozone.

Outer structure 320 may suitably comprise various additional layers of material. For example, outer structure 320 may comprise one or more fabric layers (e.g., 321 and 322). The fabric layer(s) may comprise any material for suitably achieving desirable structural properties of the heat traced pipe. For example, these structural properties may include the bending radius of the pipe, the crush resistance of the pipe, and/or the pressure rating of the pipe. In one exemplary embodiment of the present invention, the fabric is a nylon fabric, such as that manufactured by Karlon. The type of nylon, the number of layers of nylon material, and the width of the nylon overlapping wrap may be suitably selected, for example, to achieve a desired structural property. In one embodiment, the nylon fabric may be one to four thousandths of an inch thick. In other embodiments, the pipe is rated for greater than 70 pounds per square inch ("PSI"), greater than 100 PSI, or greater than 150 PSI. The pipe in general may be configured to hold pressures up to three times the expected operating pressure.

As discussed, outer structure 320 may comprise various layers of materials. In accordance with an exemplary embodiment of the present invention, outer structure 320 comprises a rubber layer formed between two fabric layers (e.g., 321 and 322). In another exemplary embodiment, only one of the two fabric layers is included in outer structure 320. Furthermore, the pipe may suitably comprise additional layers or wrappings of material that lie between inner structure 110 and outer structure 120, surrounding outer structure 120, interior to inner structure 110, within inner structure 110, and/or within outer structure 120. For example, a structural support layer or wrapping may be configured to lie within the outer structure and to increase the structural support, pressure rating, and/or minimum bending radius. The structural support layer may comprise any material, for example, a wire wrapped spirally about the center line of the pipe. The distance between the wrappings may be suitably selected based on desired structural support, pressure rating, and/or minimum bending radius. In an exemplary embodiment, the wire is a number nine wire wrapped at four inch intervals.

In accordance with an exemplary embodiment of the present invention, heat trace 130 may comprise any suitable heat generating device capable of heating at least a portion of pipe 100 and/or fluid within the pipe. In one exemplary embodiment, heat trace 130 comprises an auto-trace. Heat trace 130 may further comprise any suitable braided shield. Although various heat trace tapes may suitably protect pipe 100, in one exemplary embodiment of the present invention, heat trace 130 comprises an auto-trace supplied by Nelson Trace which is comprised of 22 gage copper wires and a 316 copper braided shield. Furthermore, heat trace 130 is configured to lie within one of the inner and outer structures or between the inner and outer structures.

An exemplary auto-trace is configured with two wires enclosed in a medium whose conductivity is temperature sensitive. Thus, as the surrounding temperature becomes colder, the auto-trace allows current to flow through the medium between the wires and to generate heat. An advantage of such a system is that the heat trace automatically regulates the need for heating. A braided shield may be useful to protect individuals from electrical shock, and to improve heat dissipation. In an exemplary embodiment, the shield may be configured to only carry a ground fault current when the trace fails.

Heat trace 130 may be located proximate to pipe 100 in any suitable configuration. Heat trace 130 may be embedded within inner structure 110, outer structure 120, or between the outer and inner structures. In an exemplary embodiment of the present invention, heat trace 130 is embedded within outer structure 120. Furthermore, heat trace 130 may be configured proximate to the pipe in any manner that does not give rise to substantial "hot spots". Hot spots may cause melting and short circuits or open circuits and thus affect the heat traced pipe's reliability and safety. In accordance with an exemplary embodiment of the present invention, heat trace 130 is provided in a linear form along one side of the flexible pipe 100. In another embodiment, the heat trace may be wrapped in a spiral fashion around the longitudinal center axis of the pipe. In accordance with an exemplary embodiment of the present invention, if pipe 100 is a header, the branches from the header may be suitably heat traced. However, in other embodiments, for example when branches are less than 14 inches long, the header branches do not require a heat trace.

In the case of a spiral wrapped heat trace, heat trace 130 may be wrapped with any appropriate spacing based on any desired heating properties. For example, in one embodiment, heat trace 130 provides eight watts/ft with 112 ohms/ft resistance and is wrapped around the center line of the pipe with four to six inches separating each wrap. Various known programs and algorithms may be developed and/or used to determine the heat output and heat trace spacing parameters appropriate to particular applications and conditions.

In one exemplary embodiment of the present invention, heat trace 130 is configured such that no portion of heat trace 130 is close enough to another portion of heat trace 130 to generate a hot spot. For example, the heat trace is wrapped such that the heat trace tape does not cross over itself. Particularly in a prefabricated flexible pipe, the flexing of pipe 100, and the curing of pipe 100 may cause segments of heat trace 130 to be pressed closer to each other. Therefore, non-overlap or limited overlap of heat trace 130 and proper spacing may facilitate improved reliability. However, other embodiments of the present invention may suitably provide sufficient protection to allow overlapping of heat trace 130.

Heat traced pipe 100 may further include a connector 140 wherein the connector comprises any device that is configured to suitably attach pipe 100 to another pipe, a valve, a fitting, a cap, and/or the like. For example, connector 140 may be any suitable industrial pipe connector used to attach pipe 100 to a butterfly valve and/or 90 degree bray valve. For example, connector 140 may comprise a bolt flange, a rotating flange 540, an auto connector 640, a split flange 740, and/or the like. Connector 140 is attached to one or both of the outer and inner structures at one or more connection points (e.g., 141) on pipe 100.

Figure 4:
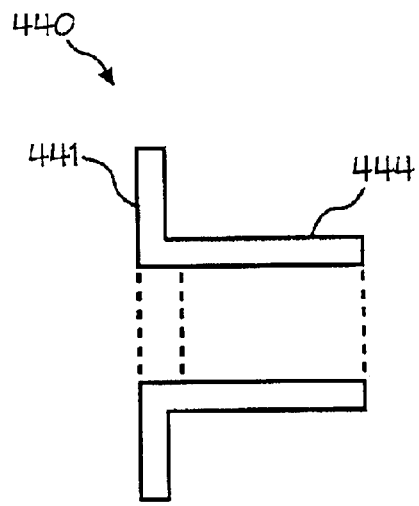
FIGS. 4–7 illustrate a side cross sectional view of an exemplary connector in accordance with an exemplary embodiment of the present invention.

In one exemplary embodiment of the present invention, the connector includes a bolt flange 340. With reference now to FIG. 4, a bolt flange 440 has a flange portion 441 and a nipple portion 444. Nipple portion 444 includes a length of pipe sufficiently long, e.g., three inches, for integral attachment as part of heat traced pipe 100. Bolt flange 440 includes a plurality of bolt holes for receiving, for example, three or more bolts. The bolts and bolt holes are configured to secure the flange 440 to a mating flange, cap, and/or valve.

Figure 5:
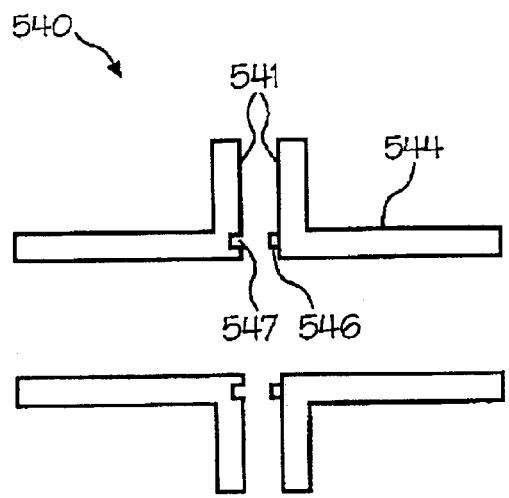

Other exemplary bolt flanges include, but are not limited to, raised face flanges, male/female flanges, tongue and groove flanges, lap joint flanges, and ring joint flanges. FIG. 5 illustrates an exemplary tongue and groove flange pair 540, comprising nipple 544, flange face 541, tongue 546, and groove 547.

Figure 6:
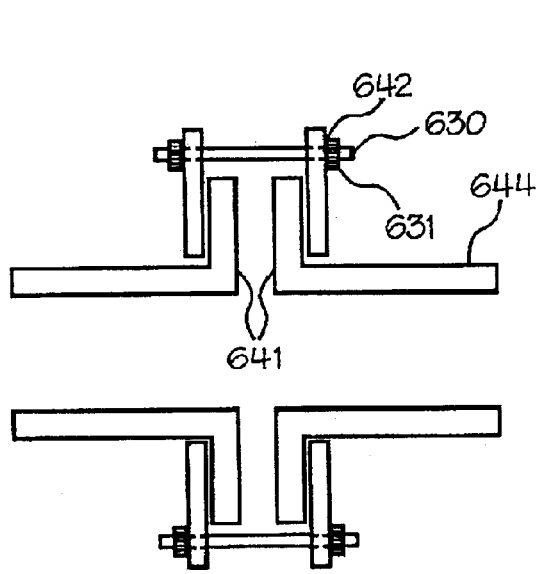

In another exemplary embodiment of the present invention, and with reference to FIG. 6, connector 140 is configured to be a rotating flange 640. In this embodiment, rotating flange 640 is configured in any suitable manner to hold flange faces 641 in compression between two rotatable collar portions 642. Collar portion 642 may be configured with an inner diameter large enough to fit around nipple 644 and/or any material provided around the nipple, while allowing collar portion 642 to rotate about the nipple. The outside diameter of collar portion 642 may be configured to be large enough that bolt holes in collar 642 can be suitably situated outside the diameter of flange face 641. Bolt holes in rotating collars 642 may be suitably receive a threaded bolt, such as an all thread rod. The rotating collars 642 are configured such that by rotating one or both collars, the bolt holes may be suitably aligned. Nut 631 may be tightened to hold flange faces 641 in compression with each other.

Figure 7:
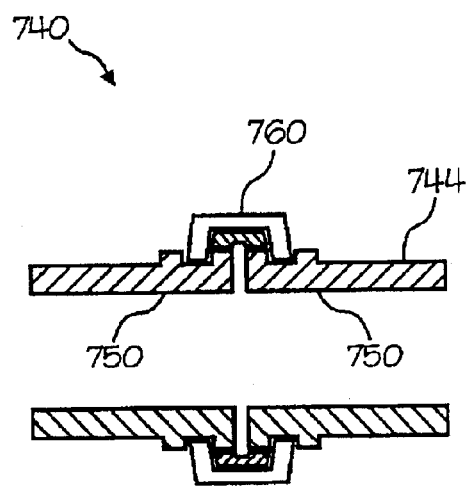

In another exemplary embodiment of the present invention, and with reference to FIG. 7, connector 140 is configured to be a groove lock connector 740. In one exemplary embodiment, groove lock connector 740 comprises a nipple 744, groove 750, and a connecting device 760. Groove lock connectors may comprise various connection methods, for example, a flange method, a cooper method, and the like.

Connector 140 is integrally attached to either inner structure 120, outer structure 130, or both. One or more connectors 140 may suitably be attached to pipe 100 at any pipe outlets. Connector 140 may comprise any suitable materials such as, for example, ceramics, plastics, and/or the like. In an exemplary embodiment of the present invention, the connector comprises, in part, metal. In the case of metal bolt flanges, the metal is protected from the corrosive fluid conveyed through the pipe by a pure gum rubber lining 310 extending at least partially through the internal portion of nipple 444.

The mating face 441 of flange 440 may include various sealing devices for containing the fluid within the pipe at connecting junctions. For example, an O-ring may be placed at least partially within a retaining groove. In yet another exemplary embodiment of the present invention, a layer of rubber on the face 441 of flange 440 may suitably at least partially seal the junction with a mating connector. See, e.g., 341.

The rubber on the face 441 of flange 440 may comprise any suitable thickness. For example, the thickness of the rubber on the face 441 of flange 440 is suitably made thin enough that the clamping force joining the flange to another object does not cause the pure gum rubber lining to substantially encroach on the interior diameter of the pipe. This encroachment could hinder the flow of fluid in the pipe, and/or impede the proper operation of connected valves such as a butterfly valve. Although various thicknesses of pure gum rubber may suitably provide a flange face seal while not substantially encroaching on the inner diameter, in one exemplary embodiment of the present invention, on a two inch inner diameter line, the pure gum rubber is ⅛" thick.

Figure 8:
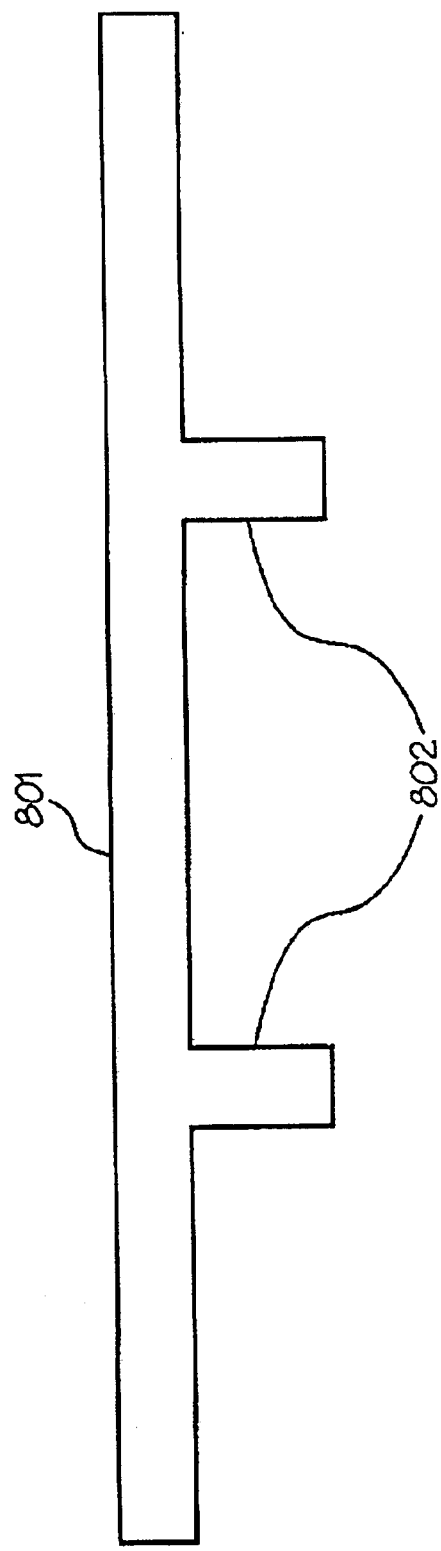
FIG. 8 illustrates a side view of an exemplary heat traced header in accordance with an exemplary embodiment of the present invention.

In accordance with an exemplary embodiment of the present invention, the pipe is a header which may comprise a pipe with one or more pipe branches. With reference now to FIG. 8, a header 800 includes a main run 801 and two branches 802; however, other numbers of branches may also be used in other embodiments. In an exemplary embodiment of the present invention, main run 801 is 104 inches long and branches 802 are each 14 inches in length, however other dimensions may also be used. Headers are useful in a variety of industrial applications where fluid in a pipe is delivered to multiple locations. Furthermore, the use of headers may reduce costs associated with multiple parts and the assembly of those parts. For example, a header with two branches can be used in the place of five segments of pipe with two tee fittings, thus saving cost of parts and labor.

Figure 9:
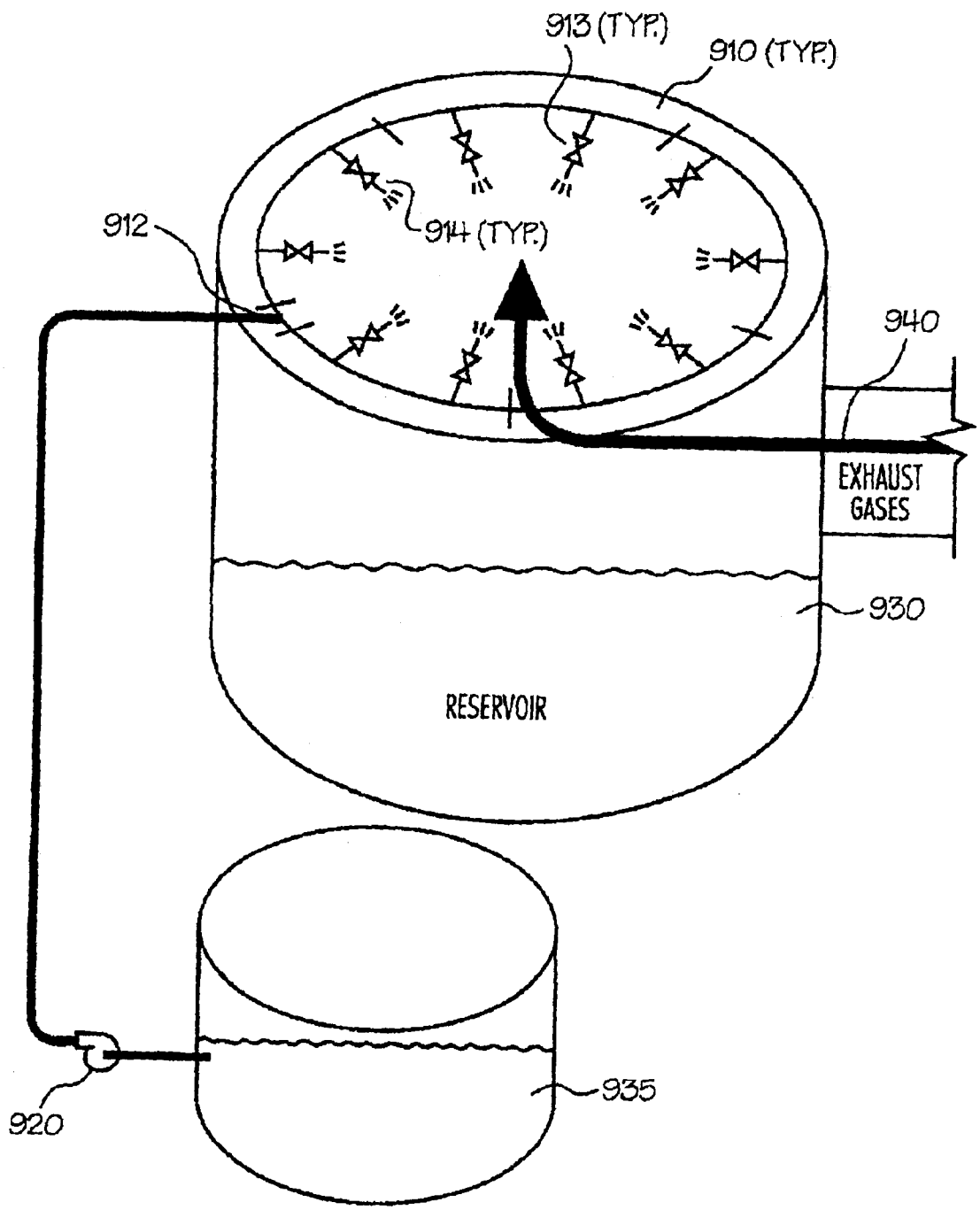
FIG. 9 illustrates an exemplary scrubber incorporating heat traced headers in accordance with an exemplary embodiment of the present invention.

In accordance with an exemplary embodiment of the present invention, the flexible heat traced header is configured for use in any suitable industrial application. In one embodiment, the flexible heat traced header is used in a scrubber for supplying process liquor to a plurality of spray nozzles. With reference now to FIG. 9, a scrubber 900 includes one or more flexible heat traced headers 910. Although various header configurations may be used in a scrubber, in one exemplary embodiment, headers 910 are configured to be attached together end to end. The headers may be configured in a circle with process liquor provided to the circular header at one or more supply tees 912. Additionally, a butterfly isolation valve may be configured between each section of heat traced header 910. The isolation valves may be useful to repair a section of the header while maintaining the other sections in full operation. Thus, scrubber 900 can be repaired without shutting down the industrial process supported by scrubber 900. Supply tees 912 are supplied by one or more pumps 920.

Pumps 920 may comprise any suitable device for moving fluid, such as centrifugal pumps, positive displacement pumps, and/or the like. Pumps 920 are configured to draw process liquor from a scrubber tank 935 and/or to pressurize water to the heated headers 910. Headers 910, in turn, deliver the process liquor to control valves 913. In accordance with an exemplary embodiment of the present invention, control valves 913 include any valve for selectively controlling the flow of fluid. In one embodiment, control valves 913 comprise Bray valves.

Control valves 913 regulate the flow of process liquor to spray nozzles 914. Spray nozzles 914 include any suitable device which can disperse the fluid, for example, in drops. In an exemplary embodiment of the present invention, spray nozzles 914 introduce a mist of water droplets into the scrubber. These water droplets absorb or otherwise capture a portion of the particles and gases in an exhaust gas stream 940. In another example, chevrons in the demister/mist-eliminator section(s), which create a torturous path for exhaust gas stream 940, are cleaned and/or kept clean by the spray water droplets. The sprays are configured to keep the chevrons from becoming plugged with solids. The water droplets may be captured by reservoir 930 where the water may be treated and/or recycled through the process again.

Figure 10:
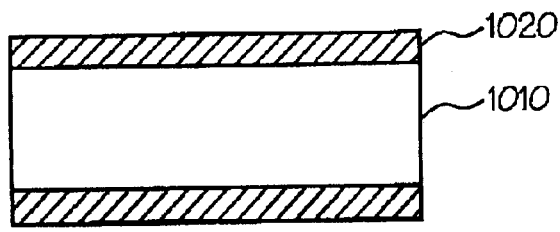
FIGS. 10–12 illustrate a side cross sectional view of an exemplary heat traced pipe in accordance with an exemplary embodiment of the present invention.

Various exemplary steps may be involved in the manufacture of the prefabricated flexible heated pipe of the present invention. Although an exemplary process is described herein, various steps may be performed in different orders, and various steps may be added or omitted in accordance with the present invention. In one exemplary embodiment, and with reference now to FIG. 10, a mandrill 1010 is suitably prepared with a releasing agent. Mandrill 1010 includes any pipe or other structure capable of supporting the formation of a pipe about its structure. Mandrill 1010 is chosen to have an outside diameter approximately equal to the desired inside diameter of the pipe. The pipe may be formed as a header by applying multiple mandrill pieces, for example, at right angles to mandrill 1010.

Mandrill 1010 is covered with a flexible corrosion resistant material 1020, such as pure gum rubber. Pure gum rubber 1020 can be applied around mandrill 1010 in any suitable manner. In one exemplary embodiment, pure gum rubber 1020 is applied around all or a portion of mandrill 1010 by wrapping a pure gum rubber tape around mandrill 1010, for example, in an overlapping pattern to a desired thickness. Pure gum rubber 1020 may be applied so that the outside diameter of the pure gum rubber is approximately equal to the inside diameter of the connector. If, for example, the connector comprises a three inch inside diameter bolt flange, the pure gum rubber is applied to a three inch outer diameter.

Figure 11:
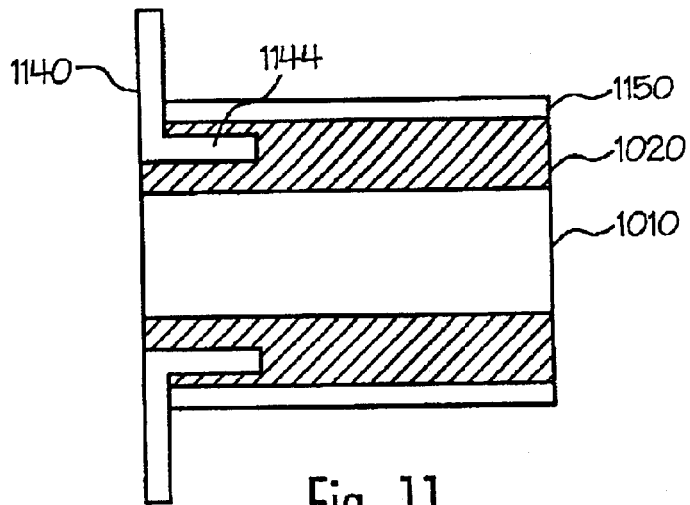

With reference now to FIG. 11, a connector, such as bolt flange 1140, is then positioned over the pure gum rubber covered mandrill, and further layers of pure gum rubber 1020 may be applied around flange nipple 1144 and all or some of the mandrill. The additional layers of pure gum rubber may suitably attach the flange to the pipe. Next, flexible corrosion resistant material 1020 may be wrapped with a fabric like material, such as a nylon fabric 1150.

Figure 12:
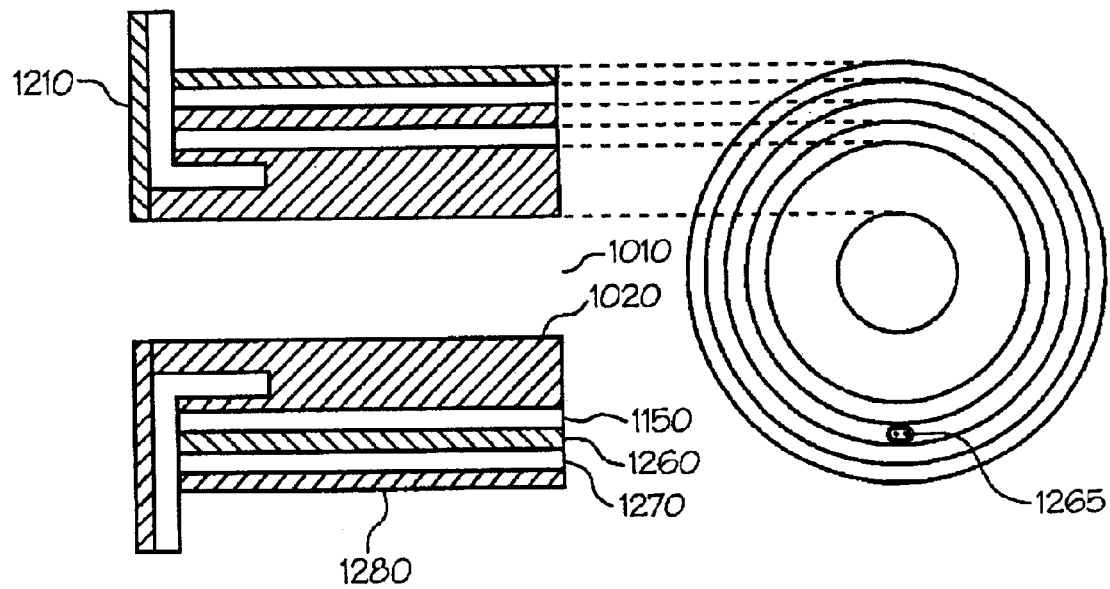

With reference now to FIG. 12, the nylon fabric layer(s) 1150 may then be wrapped with a flexible material 1260, such as rubber. Flexible material 1260 may also be applied as a rubber tape wrapped so as to overlap successive layers. After a suitable thickness of the rubber tape has been applied around the assembly, a heat trace 1265 may be applied to the pipe. Although heat trace 1265 may be applied in a linear manner, for example, along the bottom of the pipe, in another embodiment, heat trace 1265 is applied in a spiral wrapped manner around the pipe with suitable spacing between wraps.

In accordance with an exemplary step of the present invention, flexible material 1260 may be applied to enclose all or a portion of heat trace 1265 in the flexible material 1260. In other embodiments, the heat trace may be applied at different stages of this layering process, for example, in the pure gum rubber. In accordance with other exemplary steps, an additional fabric layer 1270 may be applied, and the pipe may further be wrapped with a protective material 1280 such as an EPDM protective tape. In another step, the flange face may also be covered with pure gum rubber 1210.

In another step, the entire assembly surrounding the mandrill is cured. The curing may take place at any suitable temperature. In an exemplary embodiment of the present invention, the curing is performed at a temperature of 280° F. Furthermore, the curing may be suitably performed at temperatures as high as 400° F. In one embodiment, the curing temperature may be limited by the thermal limitations of the heat trace tape. Furthermore any curing step may be used that creates a unitary flexible heat traced pipe.

Use of a pre-fabricated heat-traced header in accordance with the present invention may facilitate quick installation and cost savings. In contrast, prior art installations are typically slow and expensive. For example, in a prior art installation, a mechanic provides the labor to make appropriate piping connections, then an electrician provides the labor to add a heat trace to the piping, and finally, an insulator and or sheet metal crafts-person provides the labor to insulate and protect the assembly. The use of multiple crafts may increase the total installation time. Furthermore, the materials used in the installation are custom cut and fitted, and may result in wasted product on a case by case basis, thus increasing expense. However, in an exemplary embodiment of the present invention, a single craft, such as a mechanical craft, can install the prefabricated heat-traced header. The use of a single craft to install a pre-fabricated part may facilitate quick installation. Prefabrication may also contribute to efficient use of materials. Furthermore, the demolition or removal of a pre-fabricated heat-traced header is similarly simplified.

Additionally, under the present invention, field installation errors may be avoided or minimized such as shorts, placement of the heat trace on the top of the pipe, or damage due to bumps or scrapes during the installation process. The heat traced header may also improve durability of heat traced piping by protecting the connectors and heat trace from corrosion. In accordance with another aspect of the present invention, vibrations resilience is facilitated by the use of rubber piping.

Such general applications that may be appreciated by those skilled in the art in light of the present disclosure are not described in detail herein. However for purposes of illustration only, exemplary embodiments of the present invention are described herein in connection with a pre-fabricated rubber heat traced header for use in scrubbers. To understand the various construction sequences of the present invention, an exemplary description is provided. However, it should be understood that the preceding examples are for illustration purposes only and that the present invention is not limited to the embodiments disclosed.

The present invention has been described above with reference to an exemplary embodiment. However, those skilled in the art will recognize that changes and modifications may be made to the exemplary embodiment without departing from the scope of the present invention. For example, the various components may be implemented in alternate ways, such as varying or alternating the steps in different orders. These alternatives can be suitably selected depending upon the particular application or in consideration of a number of factors associated with the operation of the system. For example, although the present invention has been described with reference to two layers of fabric, a single layer of fabric may be used. In addition, the techniques described herein may be extended or modified for use with other types of industrial applications, in addition to the scrubber application described herein. These and other changes or modifications are intended to be included within the scope of the present invention.

What is claimed is:

1. A pre-formed flexible heat traced header comprising:
an inner structure comprising a flexible corrosion resistant material;
an outer structure configured around the inner structure and comprising a flexible material,
a heat trace, wherein the heat trace is configured within at least one of the inner and outer structures, and wherein the inner structure, outer structure, and heat trace are cured into a unitary fluid carrying device; and
a connector integral with the unitary fluid carrying device configured to facilitate use of the unitary fluid carrying device in industrial settings, wherein the connector comprises at least one of a bolt flange, a rotating flange, and a groove lock; and
wherein said heat traced header further comprises at least two branches off of said unitary fluid carrying device.

2. The header of claim 1, wherein the inner structure comprises a pure gum rubber material.

3. The header of claim 2, wherein the inner structure comprises an inner diameter greater than 1.5 inches.

4. The header of claim 1, wherein a protective layer is configured around the outer structure.

5. The header of claim 4, wherein the protective layer comprises an ethylene propylene diene monomer material.

6. The header of claim 5, further comprising a fabric layer between the outer structure and the protective layer.

7. The header of claim 1, wherein the heat trace is configured with an auto-trace.

8. The header of claim 1, wherein the heat trace is configured to not cross over itself.

9. The header of claim 1, further comprising a fabric layer between the inner structure and the outer structure.

10. A scrubber system comprising:
a plurality of spray nozzles;
a pump;
a tank; and
a pre-formed flexible heat traced header configured to convey a fluid from the tank to at least one of the plurality of spray nozzles using the pump, wherein the pre-formed flexible heat traced header comprises:
an inner structure comprising a flexible corrosion resistant material;
an outer structure configured around the inner structure and comprising a flexible material;
a heat trace, wherein the heat trace is configured within at least one of the inner and outer structures, and wherein the inner structure, outer structure, and heat trace are cured into a unitary fluid carrying device; and
a connector integral with the unitary fluid carrying device configured to facilitate use of the unitary fluid carrying device in industrial settings, wherein the connector comprises at least one of a bolt flange, a rotating flange, and a groove lock.

11. The header of claim 10, further comprising a fabric layer between the inner structure and the outer structure.

12. The header of claim 10, wherein the inner structure comprises a pure gum rubber material.

13. The header of claim 12, wherein the inner structure comprises an inner diameter greater than 1.5 inches.

14. The header of claim 10, wherein a protective layer is configured around the outer structure.

15. The header of claim 14, wherein the protective layer comprises an ethylene propylene diene monomer material.

16. The header of claim 15, further comprising a fabric layer between the outer structure and the protective layer.

17. The header of claim 10, wherein the heat trace layer is configured with an auto-trace.

18. A scrubber system comprising:
a plurality of spray nozzles;
a pump;
a tank; and
a pre-formed flexible heat traced header configured to convey a fluid from the tank to at least one of the plurality of spray nozzles using the pump, wherein the pre-formed flexible heat traced header comprises:
an inner structure comprising a flexible corrosion resistant material;
an outer structure configured around the inner structure and comprising a flexible material;
a heat trace, wherein the heat trace is configured within at least one of the inner and outer structures, and wherein the inner structure, outer structure, and heat trace are cured into a unitary fluid carrying device; and
a connector integral with the unitary fluid carrying device configured to facilitate use of the unitary fluid carrying device in industrial settings.

19. A pre-formed flexible heat traced pipe comprising:
an inner structure comprising a flexible corrosion resistant material;
an outer structure configured around the inner structure and comprising a flexible material,
a heat trace, wherein the heat trace is configured within at least one of the inner and outer structures, and wherein the inner structure, outer structure, and heat trace are cured into a unitary fluid carrying device;
a connector integral with the unitary fluid carrying device configured to facilitate use of said device in industrial settings; and
at least one branch pipe integrally connected to a main pipe, wherein said main pipe comprises said unitary fluid carrying device.

* * * * *